United States Patent
Traverso et al.

(10) Patent No.: US 10,877,219 B1
(45) Date of Patent: Dec. 29, 2020

(54) PERISCOPE OPTICAL ASSEMBLY

(71) Applicant: Cisco Technology, Inc., San Jose, CA (US)

(72) Inventors: Matthew J. Traverso, Santa Clara, CA (US); Ashley J. Maker, Pleasanton, CA (US); Sandeep Razdan, Burlingame, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/546,084

(22) Filed: Aug. 20, 2019

(51) Int. Cl.
*G02B 6/26* (2006.01)
*G02B 23/08* (2006.01)

(52) U.S. Cl.
CPC ............. *G02B 6/26* (2013.01); *G02B 23/08* (2013.01)

(58) Field of Classification Search
None
See application file for complete search history.

(56) References Cited

U.S. PATENT DOCUMENTS

| 5,379,354 | A * | 1/1995 | Jenkins | G02B 6/2813 385/24 |
| 5,917,596 | A * | 6/1999 | Jenkins | G01S 7/4802 324/76.21 |
| 9,151,893 | B2 * | 10/2015 | Kopp | H01L 33/0045 |
| 2003/0128933 | A1 | 7/2003 | Bona et al. | |
| 2004/0028336 | A1 | 2/2004 | Feuer et al. | |
| 2005/0074207 | A1 | 4/2005 | Shioda et al. | |
| 2005/0089262 | A1 * | 4/2005 | Jenkins | G02B 6/125 385/14 |
| 2005/0281502 | A1 | 12/2005 | Kobayashi | |
| 2013/0108211 | A1 | 5/2013 | Kwok et al. | |

FOREIGN PATENT DOCUMENTS

| DE | 10054370 A1 | 5/2002 |
| JP | 2004280009 A | 10/2004 |

OTHER PUBLICATIONS

U.S. Appl. No. 16/058,608, "Laset Patterned Adapters With Waveguides and Etched Connectors for Low Cost Aligment of Optics to Chips," as filed on Aug. 8, 2018.
U.S. Appl. No. 16/172,702, "Photonic Integrated Circuit Bonded With Interposer," as filed on Oct. 26, 2018.
U.S. Appl. No. 16/172,702, "Photonic Integrated Circuit Bonded With Interposer," as filed on Aug. 16, 2019.

(Continued)

*Primary Examiner* — Chad H Smith
(74) *Attorney, Agent, or Firm* — Patterson + Sheridan, LLP

(57) ABSTRACT

The present disclosure provides for periscope optical assemblies within interposers that include a bulk material having a first side and a second side opposite to the first side; a first optic defined in the bulk material at a first height in the bulk material along an axis extending between the first second sides; a second optic defined in the bulk material at a second height in the bulk material, different than the first height, along the axis; a first waveguide defined in the bulk material, extending from the first side to the first optic; a second waveguide defined in the bulk material, extending from the second optic to the second side; and a third waveguide defined in the bulk material, extending from the first optic to the second optic.

19 Claims, 14 Drawing Sheets

(56) References Cited

OTHER PUBLICATIONS

LaserFocusWorld, "Optical Manufacturing: Femtosecond-laser direct-written waveguides produce quantum circuits in glass," Jul. 8, 2014, 8 pages.
PCT, Notification of Transmittal of the International Search Report and the Written Opinion of the International Searching Authority, or the Declaration, Application PCT/US2020/046888, dated Nov. 10, 2020, pp. 30.

* cited by examiner

US 10,877,219 B1

PERISCOPE OPTICAL ASSEMBLY

TECHNICAL FIELD

Embodiments presented in this disclosure generally relate to fabricating features in optoelectronic devices. More specifically, embodiments disclosed herein provide for the production of waveguide and mirrors in the light path of the waveguides to redirect the light path.

BACKGROUND

Waveguides are optical components that confine and direct the path that light travels within the medium of an optical device. The optical waveguides define areas of increased refractive index relative to the optical medium (e.g., $SiO_2$) to direct the light along a desired trajectory. Due to the refractive index difference of the waveguides relative to bulk material of the optical device, waveguides can define curved paths that gradually shift the light from one straight path to another.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
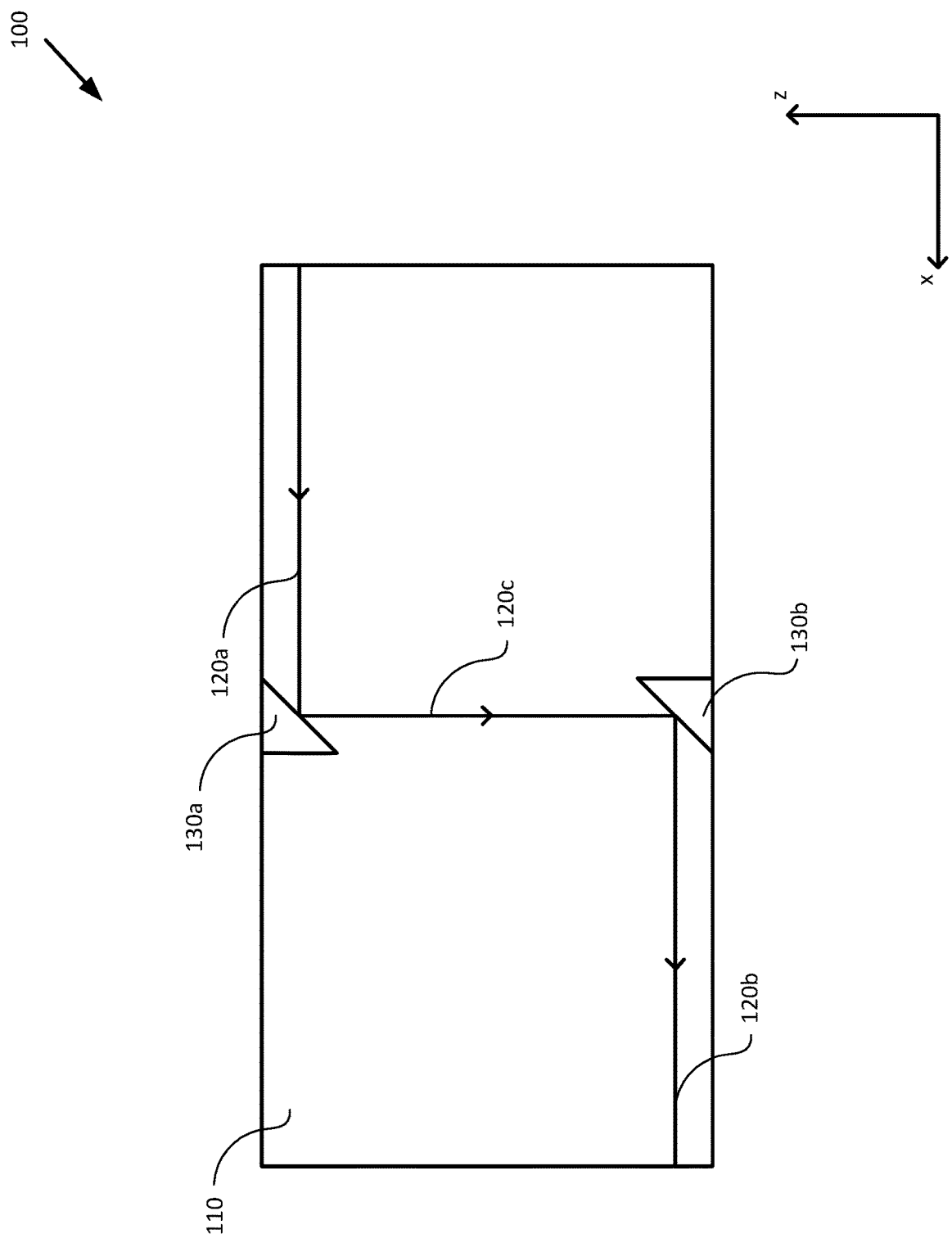
FIG. 1 illustrates a cutaway view of a periscope assembly, according to embodiments of the present disclosure.

One embodiment presented in this disclosure describes an interposer, comprising: a bulk material having a first side and a second side opposite to the first side; a first optic defined in the bulk material at a first height in the bulk material along an axis extending between the first second sides; a second optic defined in the bulk material at a second height in the bulk material, different than the first height, along the axis; a first waveguide defined in the bulk material, extending from the first side to the first optic; a second waveguide defined in the bulk material, extending from the second optic to the second side; and a third waveguide defined in the bulk material, extending from the first optic to the second optic.

One embodiment presented in this disclosure describes a method, comprising: defining a first mirror in a bulk material at a first height; defining a second mirror in the bulk material at a second height, different than the first height; defining a first waveguide in the bulk material, optically connected to the first mirror and a first edge of the bulk material; defining a second waveguide in the bulk material, optically connected to the second mirror and a second edge of the bulk material, different than the first edge; and defining a third waveguide in the bulk material, optically connected to the first mirror and the second mirror to define a light path from the first edge to the second edge via the first waveguide, the first mirror, the third waveguide, the second mirror, and the second waveguide.

One embodiment presented in this disclosure describes a system, comprising: a first waveguide defined in a first plane of a bulk material; a second waveguide defined in a second plane of the bulk material, parallel to the first plane; a third waveguide defined in a third plane of the bulk material that intersects the first plane and the second plane; a first mirror defined at a first intersection of the first plane and the third plane and optically connected to the first waveguide and the third waveguide; and a second mirror defined at a second intersection of the third plane and the second plane and optically connected to the third waveguide and the second waveguide.

EXAMPLE EMBODIMENTS

The present disclosure provides systems and methods for the creation and deployment of periscope interposers and other optical devices using mirrors defined in the light paths of waveguides to rapidly and compactly redirect the direction in which light travels in the optical device. By defining at least a pair of mirrors in the light path, via etching, lithography, metal plating, chemical deposition, precision molding, and/or laser patterning, the periscope assembly can receive optical signals on one plane and redirect those optical signals to another plane, including planes parallel to the original plane, over a shorter distance than if the waveguide were curved to direct the optical signals to a new plane. Additionally, by staggering several mirrors, the waveguides can receive optical signals in a first physical arrangement, and output optical signals in a different physical arrangement.

Although the present disclosure generally provides examples related to interposers including mirrors and waveguides as internally defined components, the creation and deployment of periscope optical components can include additional optical and electrical elements, such as, for example, optical gratings, phase shifters, optical filters, and the like.

FIG. 1 illustrates a cutaway view of a periscope assembly 100 (e.g., an interposer), according to embodiments of the present disclosure. In various embodiments, the periscope assembly 100 of FIG. 1 is constructed as one component made of an optical bulk material 110, such as, for example, $SiO_2$, in which a first waveguide 120a (generally, waveguide 120), second waveguide 120b, third waveguide, first mirror 130a (generally, mirror 130), and second mirror 130b are defined. In other embodiments, the periscope assembly 100 of FIG. 1 represents a fully constructed multi-piece periscope assembly, such as is discussed in greater detail in regard to FIG. 2.

Although generally described in relation to mirrors 130, the examples provided herein may be understood to include several other optics, including, but not limited to: mirrors, lenses, optical gratings, filters, and combinations thereof. The optics may be defined by various processes in the bulk material 110 to have different effects on optical signals carried in the bulk material 110 based on the refractive index and the angle of the light passing from one region in the bulk material 110 to another. For example, a waveguide 120 may be defined to confine light to a predefined path in the bulk material 110, whereas a mirror 130 may redirect light received in one direction to a second direction. Other optics may have other effects on light carried in the bulk material 110, such as a lens focusing/converging or diffusing/diverging incoming light, an optical grating splitting and diffracting light into several beams, a filter removing/blocking/attenuating/polarizing certain wavelengths of light, etc.

As illustrated in FIG. 1, a first waveguide 120a runs in parallel to a second waveguide 120b, and a third waveguide 120c is optically coupled to the first and second waveguide 120a-b via a first mirror 130a and a second mirror 130b. The first mirror 130a is defined to receive optical signals carried on the first waveguide 120a and reflect those optical signals onto the third waveguide 120c. The second mirror 130b is defined to receive the optical signals carried on the third waveguide 120c and reflect those optical signals onto the second waveguide 120b. The mirrors 130 may have various sizes, shapes, configurations of reflective surface, and interfaces with the waveguides 120 (e.g., lenses, filters) in various embodiments.

Figure 2:
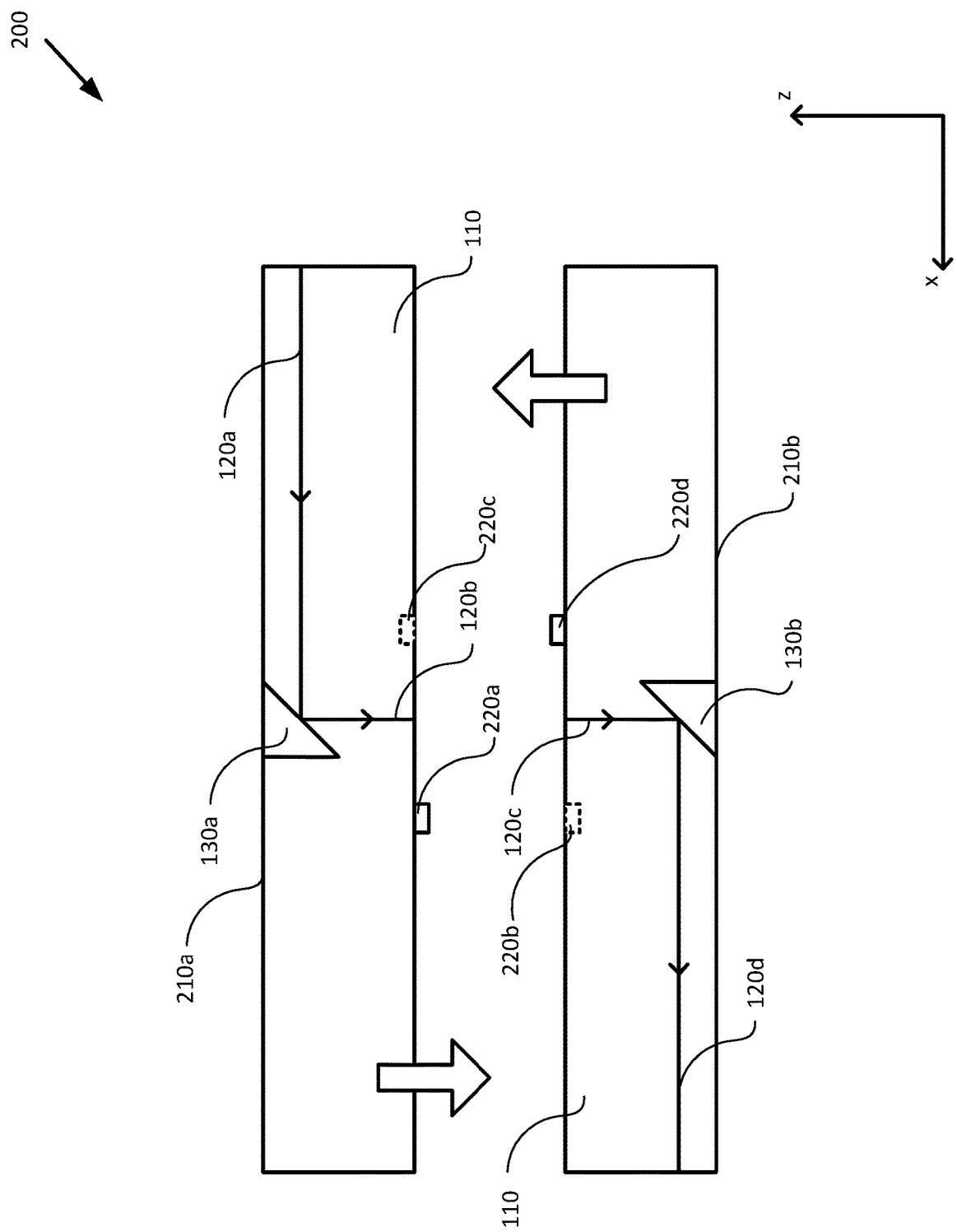
FIG. 2 illustrates a cutaway view of a two-piece periscope assembly, according to embodiments of the present disclosure.

FIG. 2 illustrates a cutaway view of a two-part periscope assembly 200, which, when assembled, may provide the periscope assembly 100 illustrated in FIG. 1. As illustrated in FIG. 2, a first component 210a includes a first waveguide 120a, a second waveguide 120b, and a first mirror 130a disposed between the first waveguide 120a and the second waveguide 120b that are defined in the bulk material 110 of the first component 210a. A second component 210b includes a third waveguide 120c, a fourth waveguide 120d, and a second mirror 130b disposed between the third waveguide 120c and the fourth waveguide 120d that are defined in the bulk material 110 of the second component 210b.

Various alignment features 220a-d (generally, alignment feature 220), such as paired male and female interconnects, may be defined in and on the bulk materials 110 of the first and second components 210a-b (generally, two components 210) to align the second waveguide 120b and the third waveguide 120c, so that when the two components 210 are joined together, the second and third waveguides 120b-c define one continuous waveguide 120. In various embodiments, the two components 210 are joined together via an epoxy joint, solder, thermocompression, or a die level process to bond and secure the components together. In various embodiments, the alignment features 220 are designed to self-align relative to a paired alignment feature to align the waveguides 120 in the periscope. For example, the alignment features 220 may be formed as U-grooves, V-grooves, interlocking notches, trapezoidal features, etc.

In some embodiments, the waveguides 120 and mirrors 130 in FIGS. 1 and 2 may be defined within the bulk material 110 by a three-dimensional laser patterning process to affect the material matrix of the bulk material 110 and thereby the refractive index of the material to contain light on a defined pathway as a waveguide 120, or to reflect and sharply redirect the light onto a new pathway as a mirror 130. In some embodiments, the waveguides 120 and mirrors in FIGS. 1 and 2 are defined via a multilayered lithographic process, or with a combination of lithographic and laser patterning processes. For example, a fabricator may use laser patterning to define the paths of the waveguides 120, and a physical and/or chemical etching process to define the mirrors 130. Other techniques, such as grayscale lithography, can be used to pattern three-dimensionally sloped mirrors 130 and optics in the bulk material 110.

In some embodiments, the mirrors 130 are defined as three-dimensional reflective structures within the bulk material 110, while in other embodiments, the mirrors 130 are defined via a reflective surface treatment. For example, a laser can positively define the structure of a mirror 130 by imparting a region with a different refractive index from the bulk material 110 and the waveguides 120 to reflect optical signals applied thereto to a different waveguide 120. For example, a laser can alter the material matrix of a bulk material 110 such as $SiO_2$ to impart a region with a different reflectivity to certain wavelengths of light. In another example, a lithographic etching process can negatively define the structure of a mirror 130 by removing bulk material 110, and a fabricator can polish or apply a reflective coating applied to a surface defined in the etched region to define the mirror 130. Additionally, although not illustrated, a fabricator may apply a surface treatment and/or a lens to the interfaces between two waveguides 120 to reduce back reflection and/or signal power loss when an optical signal transitions from one waveguide 120 to another. In additional embodiments, index matching epoxy or antireflective coatings can also be used to reduce back reflection.

Figure 3:
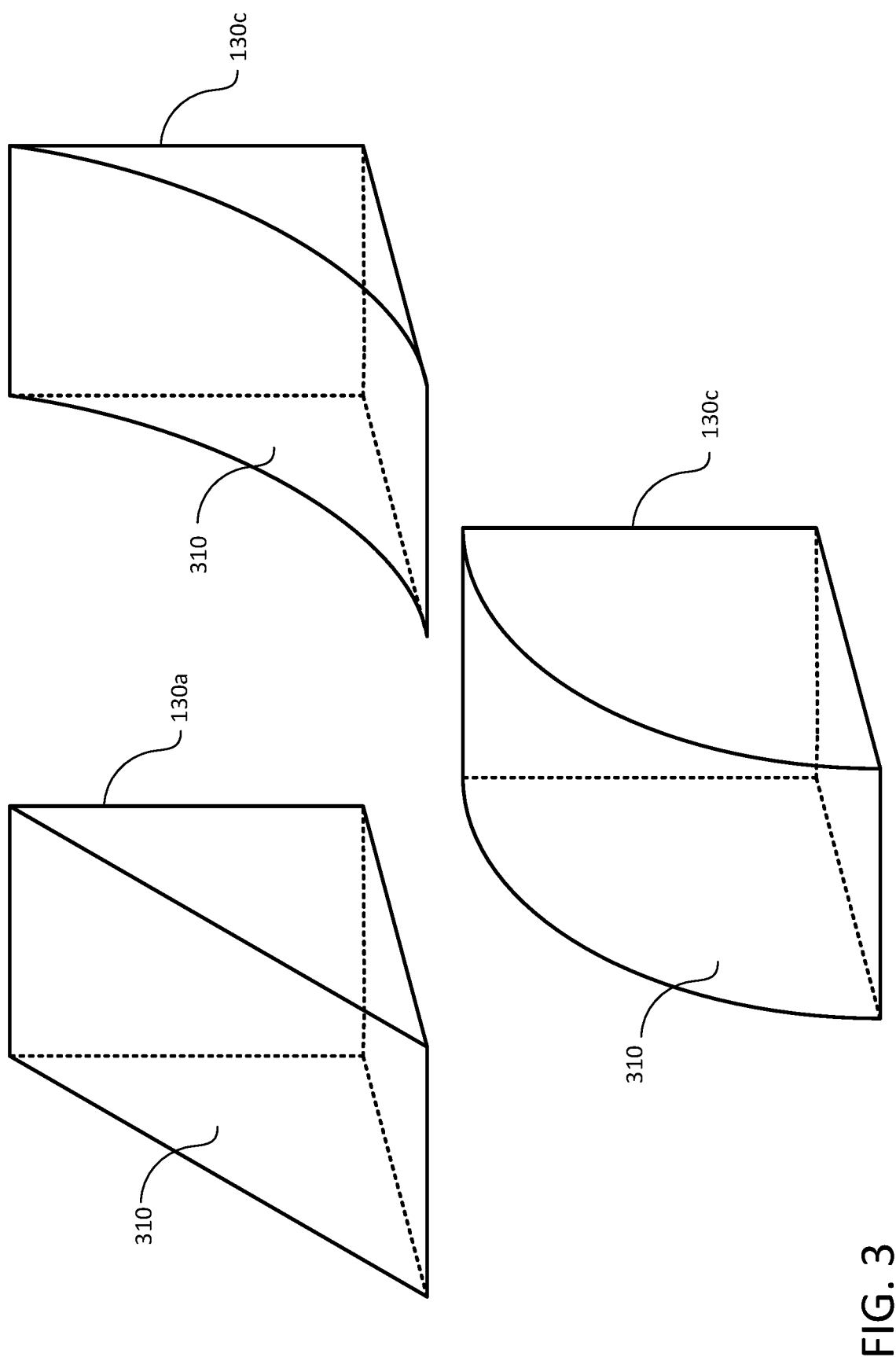
FIG. 3 illustrates a series of mirrors of different layouts, according to embodiments of the present disclosure

FIG. 3 illustrates a series of mirrors 130 of different layouts, according to embodiments of the present disclosure. The first mirror 130a includes a flat reflective surface 310, while the second mirror 130b and third mirror 130c include curved reflective surfaces 310. Each of the illustrated mirrors 130 may be understood to be a positively defined "prism" or a negatively defined "void". When interpreted as a prism, a reflective surface 310 is defined on an "exterior" surface to reflect optical signals. When interpreted as a void, a series of walls define the void, and a reflective surface 310 is defined on one "interior" surface of a wall to reflect optical signals. Accordingly, the second mirror 130b may be concave when defined by a prism structure and convex when defined by a void. Similarly, the third mirror 130c may be convex when defined by a prism structures and concave when defined by a void. Although the present disclosure primarily illustrates the example mirrors 130 as including flat reflective surfaces 310, a fabricator may use various curved surfaces when defining the mirrors 130. Additionally, although illustrated as providing one reflective surface 310 per mirror 130, a fabricator may define mirrors 130 with more than one reflective surface 310 or mirrors 130 in which the reflective surface 310 varies in orientation and curvature at different locations.

Figure 4A:
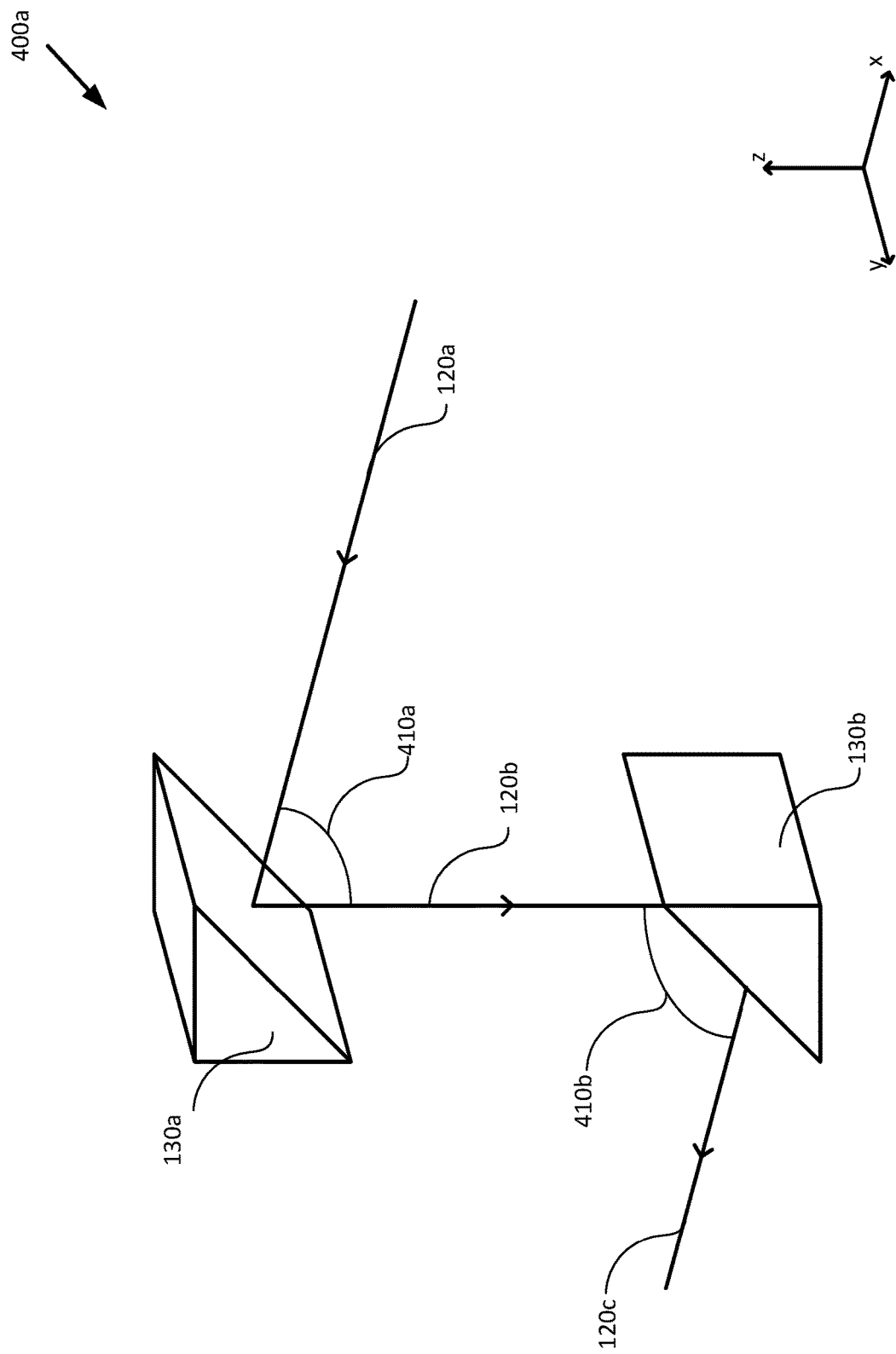
FIGS. 4A-4C illustrate several alignments of two mirrors and three associated waveguides. According to embodiments of the present disclosure.
Figure 4B:
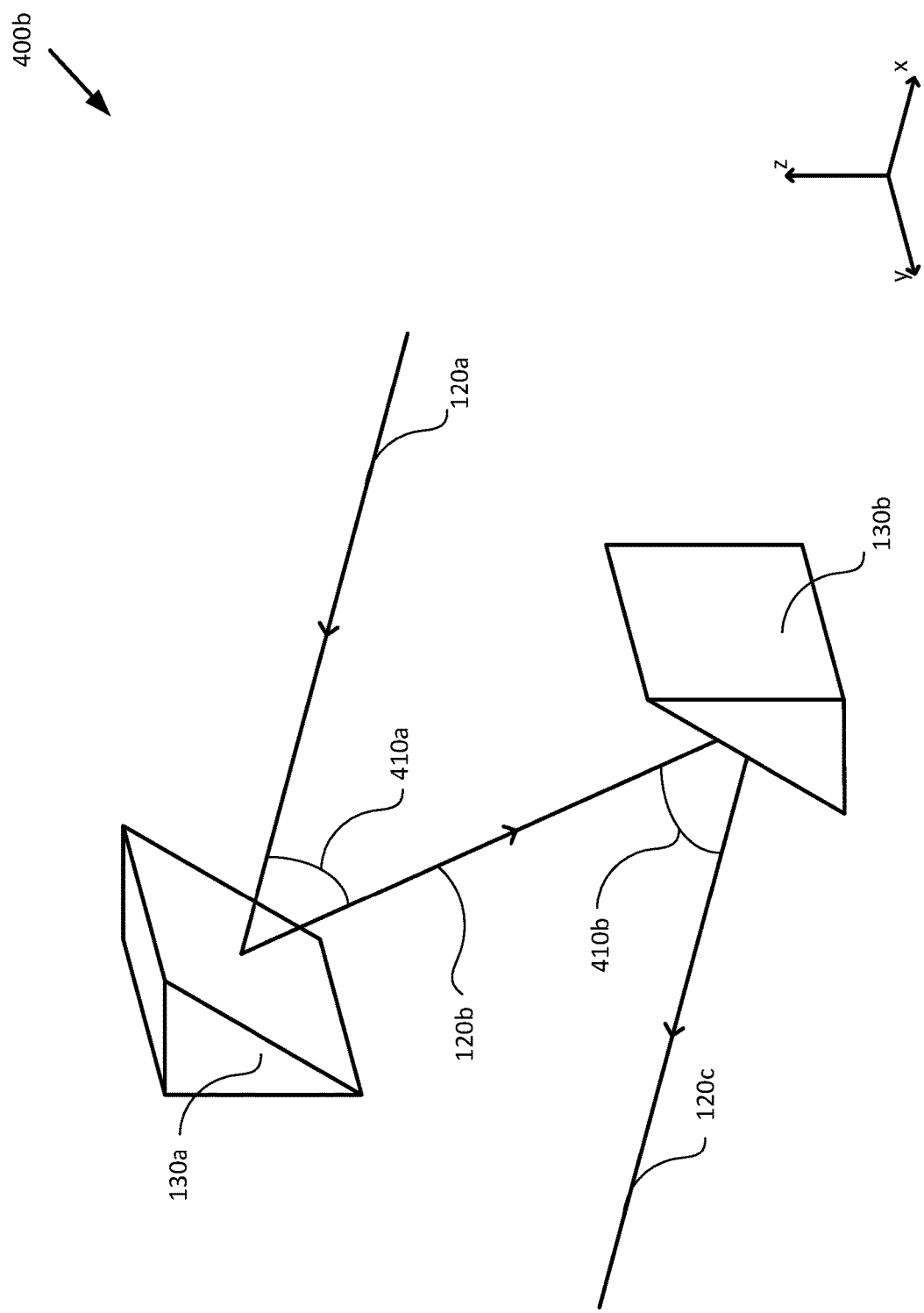
Figure 4C:
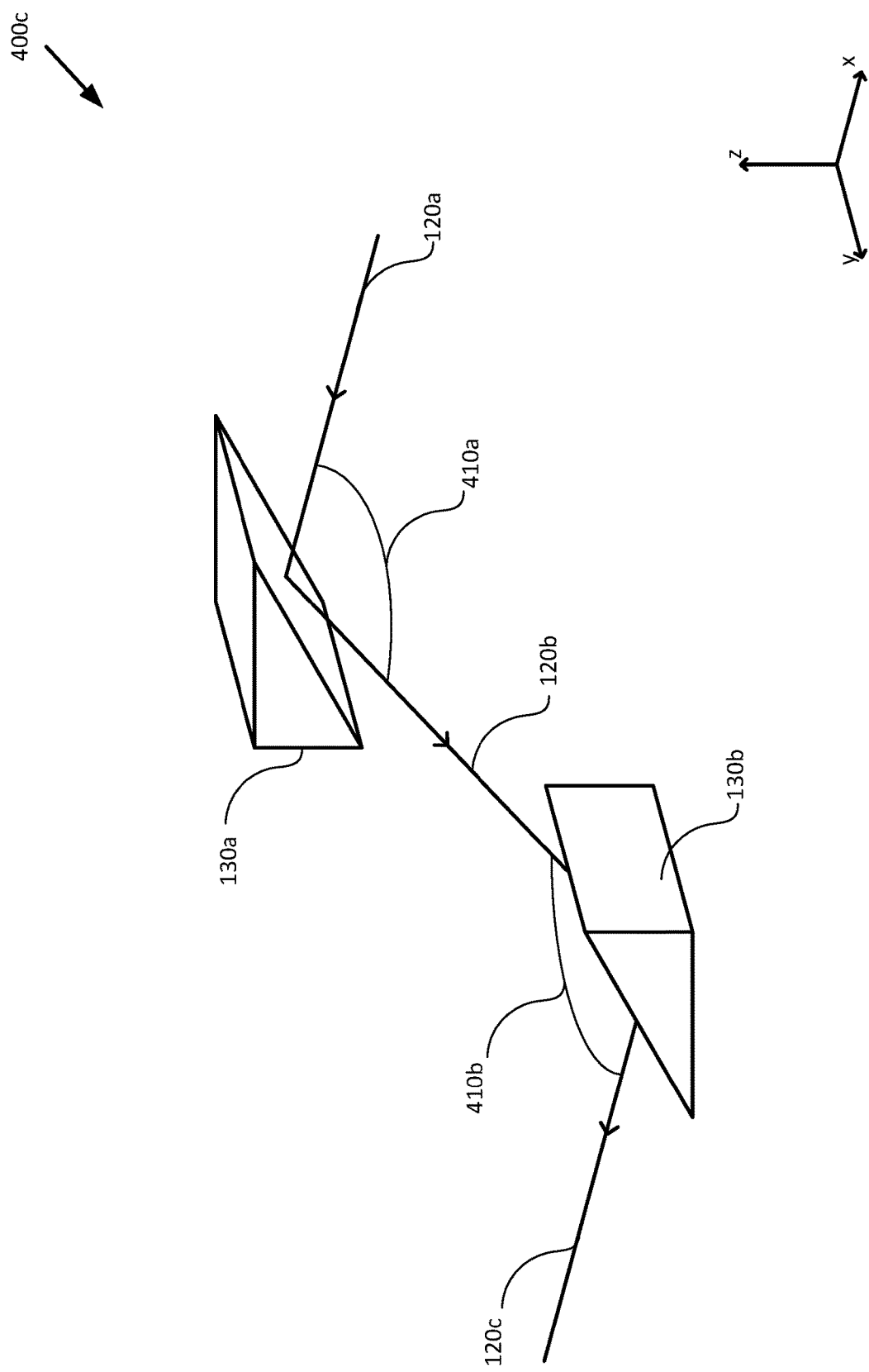

FIGS. 4A-4C illustrate several alignments 400a-c (generally, alignment 400) of two mirrors 130 and three associated waveguides 120. Each of the alignments 400a-c shows different reflective angles 410a-b from the mirrors 130. Although the first reflective angle 410a and second reflective angle 410b for each of the alignments 400a-c are shown as equal to each other in a given alignment 400 (e.g., both 90 degrees), a fabricator may construct or angle the mirrors 130 to produce an alignment 400 that includes a first reflective angle 410a that differs from the second reflective angle 410b.

Each of the alignments 400a-c illustrates a first waveguide 120a running in a first direction feeding an optical signal into a first mirror 130a which reflects the optical signal to a second waveguide 120b running in an intersecting path to the first waveguide 120a. The second waveguide 120b feeds the optical signal into a second mirror 130b, which reflects the optical signal to a third waveguide 120c, which runs on an intersecting path to the second waveguide 120b, and may run parallel to the first waveguide 120a on a different plane.

The alignment 400a of FIG. 4A illustrates reflective angles that position the second waveguide 120b perpendicularly to the first waveguide 120a and the third waveguide 120c (i.e., reflective angles 410 of 90 (±2) degrees). The alignment 400b of FIG. 4B illustrates reflective angles that position the second waveguide 120b acutely to the first waveguide 120a and the third waveguide 120c (i.e., reflective angles 410 of less than 90 (±2) degrees). The alignment 400c of FIG. 4C illustrates reflective angles that position the second waveguide 120b obtusely to the first waveguide 120a and the third waveguide 120c (i.e., reflective angles 410 of greater than 90 (±2) degrees).

A fabricator may adjust the reflective angles 410 between two waveguides 120 by altering the angle of the reflective surface 310 incident to the waveguides 120, altering the curvature of the reflective surface 310, inserting or defining a lens on or at the reflective surface 310, etc.

Figure 5:
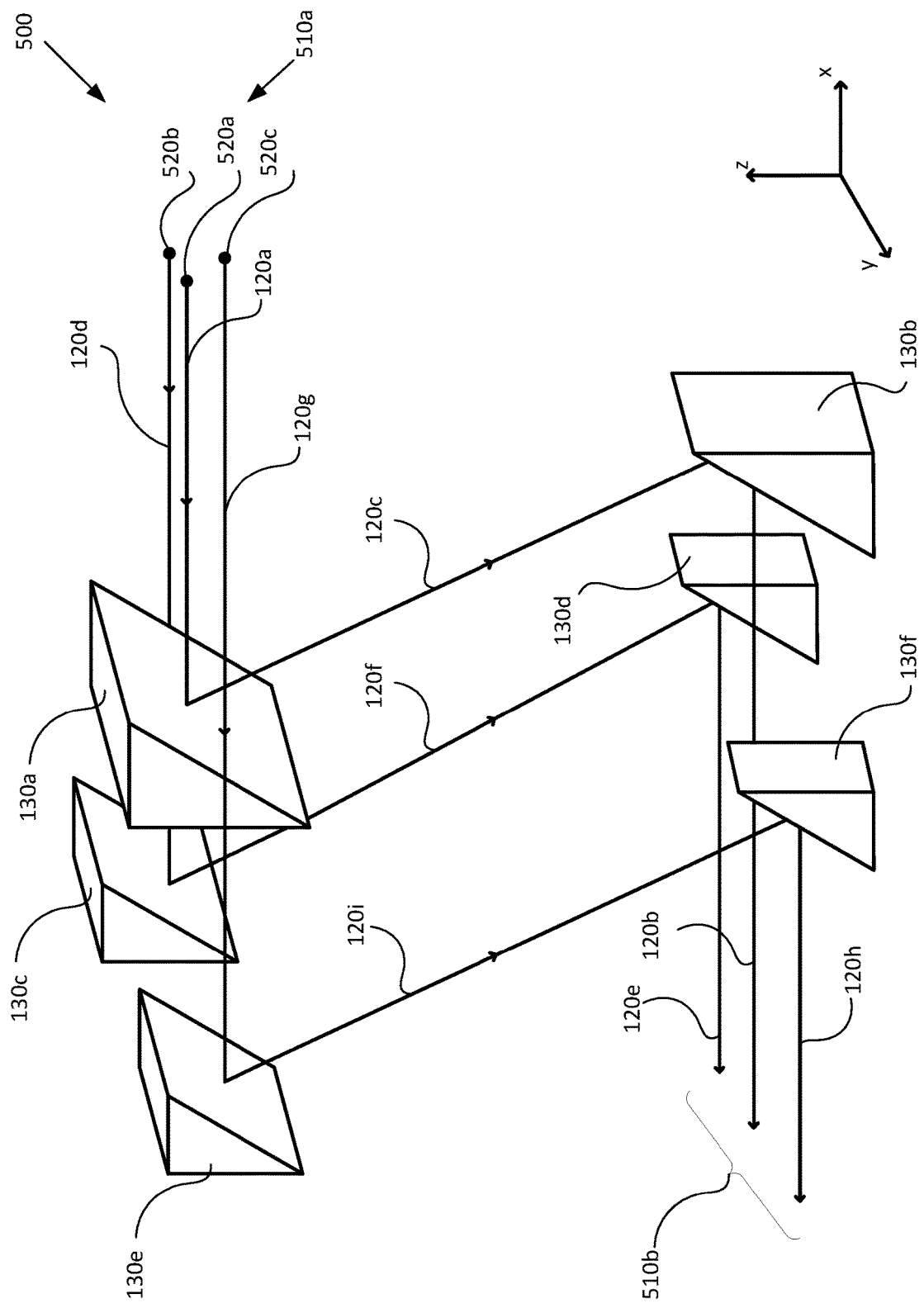
FIG. 5 illustrates a reordered waveguide layout, according to embodiments of the present disclosure.

FIG. 5 illustrates a reordered waveguide layout 500, according to embodiments of the present disclosure. In the reordered waveguide layout 500, a first plurality of waveguides are defined in a first pattern 510a at an input, and are defined in a second pattern 510b at an output; (generally, pattern 510). As illustrated, three light paths 520a-c (generally, light path 520) (including one or more waveguides 120 and the associated lenses, filters, etc.) are arranged triangularly in different planes in the first pattern 510a, and linearly in a shared plane in the second pattern 510b, but other patterns 510 are contemplated (e.g., circular, rectangular, W-shaped, etc.).

To reorder the pattern 510 of the light paths 520, a set of staggered and paired mirrors 130 are defined in each light path 520 to alter the relative paths of the waveguides 120 therein. For example, the first mirror 130a and the second mirror 130b are disposed in the first light path 520a to accept signals carried by a first waveguide 120a in a first plane, and direct those signals onto a second waveguide 120b in a second plane via a third waveguide 120c defined between the first and second mirrors 130a-b. The third mirror 130c and the fourth mirror 130d, in the illustrated example, are disposed in the second light path 520b to accept signals carried by a fourth waveguide 120d in a plane different than the first plane or the second plane, and direct those signals onto a fifth waveguide 120e in the second plane (e.g., linearly arranged with the second waveguide 120b) via a sixth waveguide 120f defined between the third and fourth mirrors 130c-d. Similarly, the fifth mirror 130e and the sixth mirror 130f are disposed in the third light path 520c to accept signals carried by a seventh waveguide 120g in a plane different than the first plane or the second plane, and direct those signals onto an eighth waveguide 120h in the second plane (e.g., linearly arranged with the second waveguide 120b) via a ninth waveguide 120i defined between the fifth and sixth mirrors 130e-f.

Additionally, although illustrated as a polygonal to linear reordering, a fabricator may reorder a first pattern 510a into various types, shapes, and orientations of different second patterns 510b or alter the relative order of individual light paths 520 in the same shape of patterns 510a-b in other embodiments. For example, if the first pattern 510a is a linear arrangement of a first, second, and third light paths 520a-c in a plane parallel to the xy-plane, a fabricator may define the mirrors 130 such that the second pattern 510b is also linear, but presents the first, second, and third light paths 520a-c in a plane parallel to the xz-plane. In another example, if the first pattern 510a is a linear arrangement of a first, second, and third light paths 520a-c sequentially from left to right, the fabricator may define the mirrors 130 such that the second pattern 510b is also linear, but sequentially presents (from left to right) the third light path 520c, the first light path 520a, and the second light path 520b.

A fabricator may deploy several different staggered mirrors 130 with different reflective angles, different relative locations to the edges of an interposer (e.g., at different x and y coordinates according to FIG. 5), and different relative heights within an interposer (e.g., at different z coordinates according to FIG. 5) to affect different reordering of patterns 510 for the incoming and outgoing waveguides 120.

Figure 6:
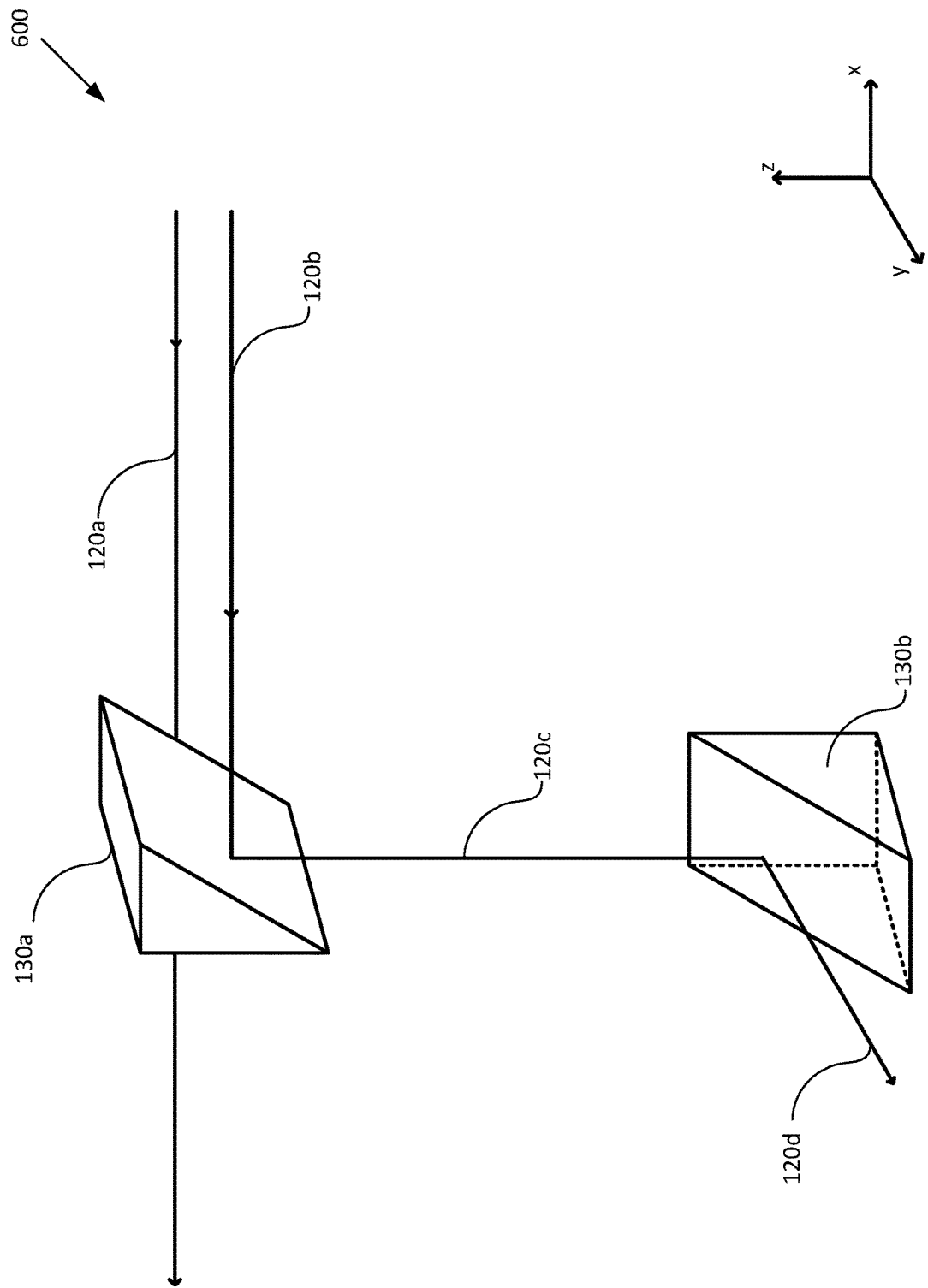
FIG. 6 illustrates a mirror arrangement, according to embodiments of the present disclosure.

FIG. 6 illustrates a mirror arrangement 600, according to embodiments of the present disclosure. In the mirror arrangement 600 of FIG. 6, a first waveguide 120a bypasses a first mirror 130a and optical signals carried thereon are not reflected by that first mirror 130a in a new direction or plane. In contrast, optical signals carried by the second waveguide 120b of FIG. 6 are reflected from the first mirror 130a onto a third waveguide 120c, which in turn are reflected from a second mirror 130b onto a fourth waveguide 120d. A fabricator may define the waveguides 120 and mirrors 130 such that not every optical signal is guided by the periscope assembly to a new plane (e.g., terminating a subset of waveguides 120, bending rather than periscoping a subset of waveguides 120, allowing a subset of waveguides 120 to run un-redirected). A fabricator may also define the waveguides 120 and mirrors 130 such that some optical signals are not only redirected to new planes, but to new directions. For example, a periscope assembly may receive optical signals along the x-axis in a first plane, and redirect those optical signals to a second plane along the x-axis, the y-axis, or another direction.

Figure 7:
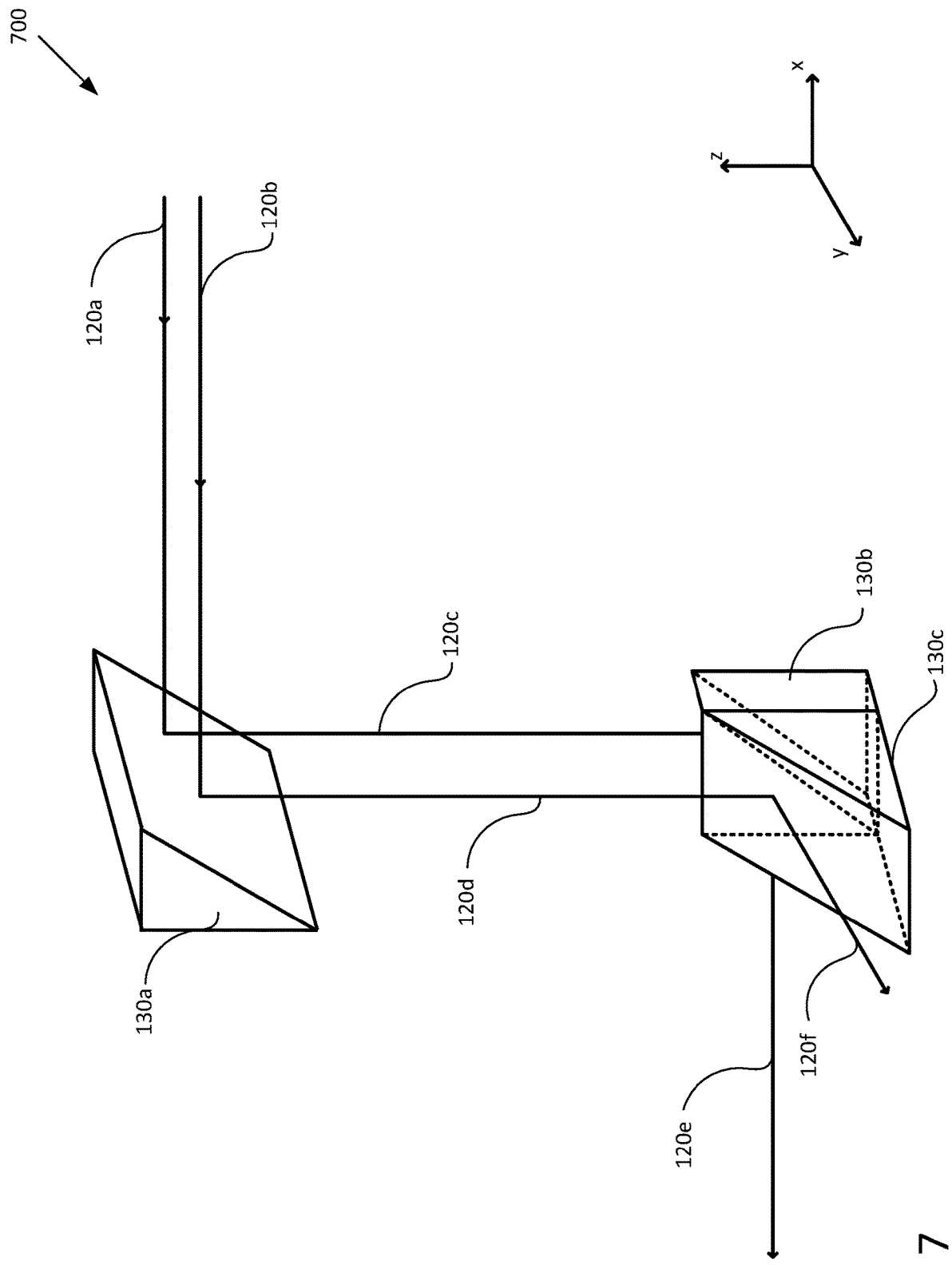
FIG. 7 illustrates a mirror arrangement, according to embodiments of the present disclosure.

FIG. 7 illustrates a mirror arrangement 700, according to embodiments of the present disclosure. In the mirror arrangement 700 of FIG. 7, optical signals carried by a first waveguide 120a and a second waveguide 120b are reflected from a first mirror 130a onto a third waveguide 120c and a fourth waveguide 120d, respectively. The optical signals carried by the third waveguide 120c are reflected from a second mirror 130b onto a fifth waveguide 120e, and the optical signals carried by the fourth waveguide 120d are reflected from a third mirror 130c onto a sixth waveguide 120f. A fabricator may define the waveguides 120 and mirrors 130 such that one mirror 130 redirects optical signals in a different plane and/or direction than another mirror 130 despite being received in the same plane and/or direction. For example, the optical signals carried by the first and second waveguides 120*a-b* may be received by the first mirror 130*a* in the same direction (e.g., along the x-axis) and be redirected by the second and third mirrors 130*b-c* in different directions (e.g., along the x-axis and y-axis, respectively).

Figure 8:
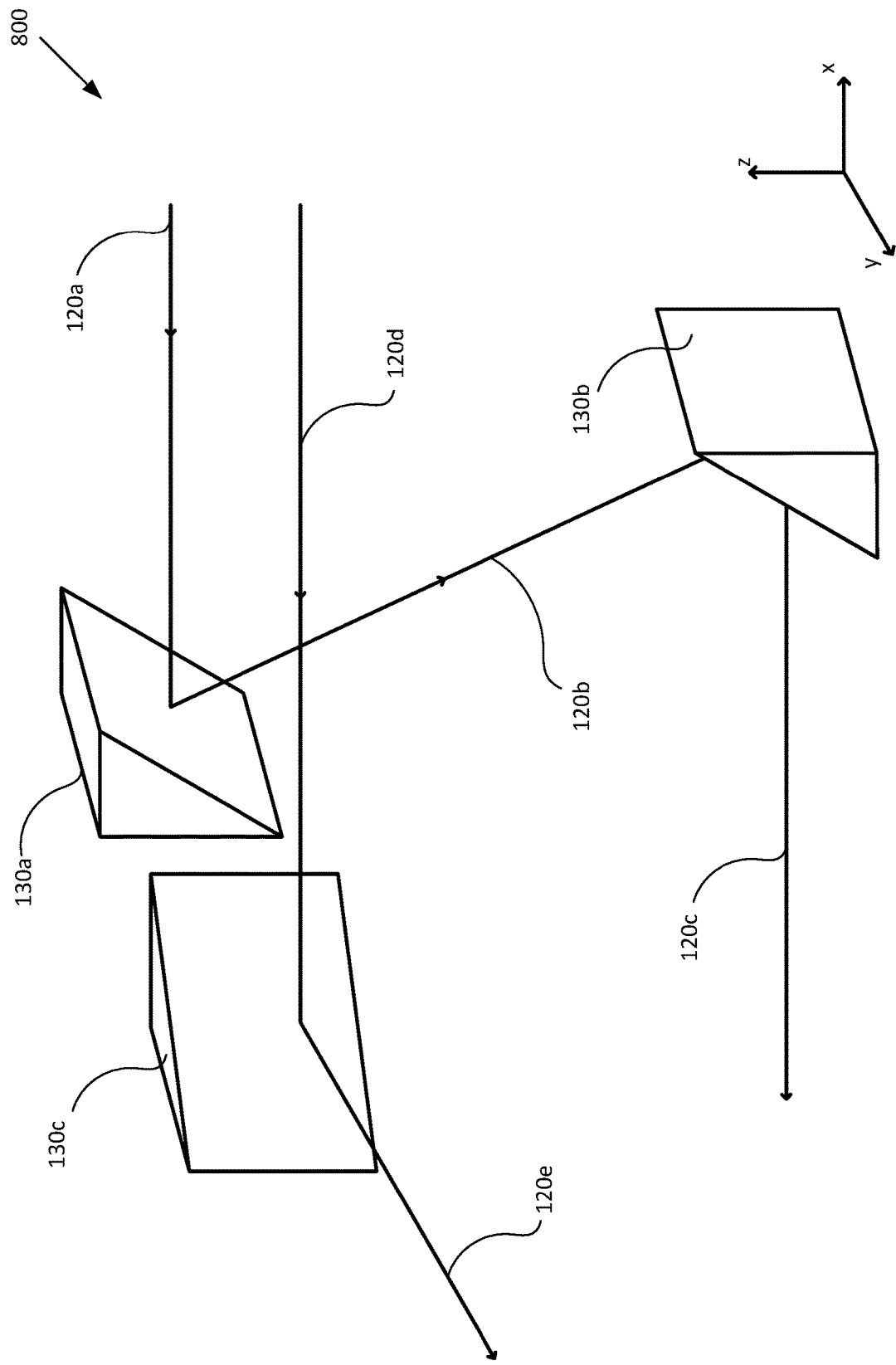
FIG. 8 illustrates a mirror arrangement, according to embodiments of the present disclosure.

FIG. 8 illustrates a mirror arrangement 800, according to embodiments of the present disclosure. In the mirror arrangement 800 of FIG. 8, optical signals carried by a first waveguide 120*a* are reflected from a first mirror 130*a* onto a second waveguide 120*b* and are reflected from a second mirror 130*b* onto a third waveguide 120*c* to change the plane in which the optical signal is carried. A fourth waveguide 120*d* carries optical signals that are reflected by a third mirror 130*c* onto a fifth waveguide 120*e* to carry the optical signals in a new direction in the initial plane. A fabricator may define the waveguides 120 and mirrors 130 such that multiple mirrors 130 redirect optical signals received in the same plane and/or direction are redirected in different planes and/or directions from one another. For example, the optical signals carried by the first waveguide 120*a* and fourth waveguide 120*d* may be received by the first mirror 130*a* and the third mirror 130*c* in the same direction (e.g., along the x-axis) and be redirected in different directions and planes from one another.

Figure 9:
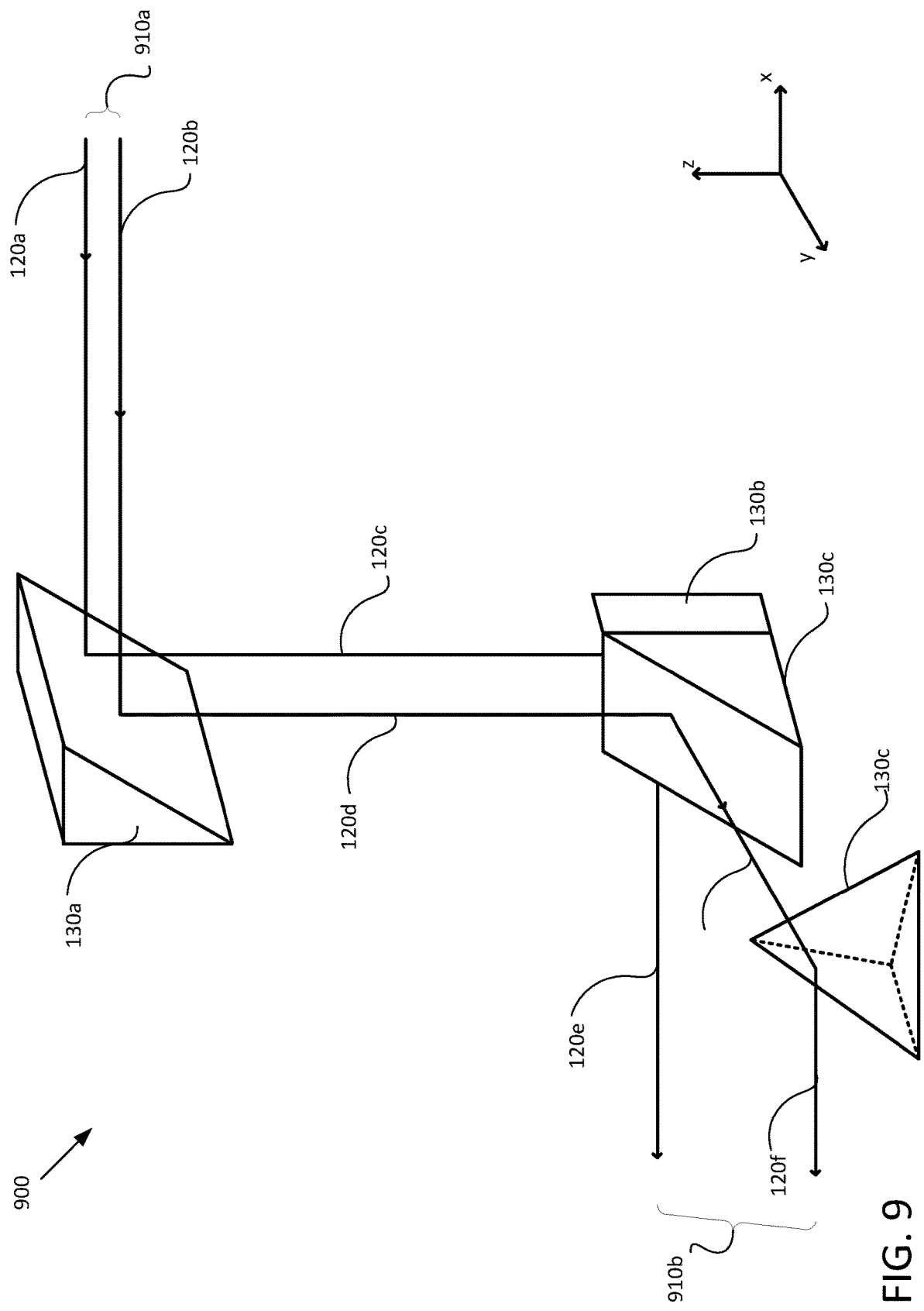
FIG. 9 illustrates a mirror arrangement, according to embodiments of the present disclosure.

FIG. 9 illustrates a mirror arrangement 900, according to embodiments of the present disclosure. In the mirror arrangement 900 of FIG. 9, four mirrors 130*a-d* are disposed in the substrate to adjust a spacing between two light paths as received and as output. For example, a first distance 910*a* between a first waveguide 120*a* and a second waveguide 120*b* as input may be different than a second distance 910*b* between a corresponding fifth waveguide 120*e* and sixth waveguide 120*f* as output. A fabricator may define the waveguides 120 and mirrors 130 such that multiple mirrors 130 redirect optical signals received on waveguides 120 arranged in one pattern into a differently spaced version of that pattern on the same or a different plane and/or direction as the waveguides 120 are received.

Figure 10:
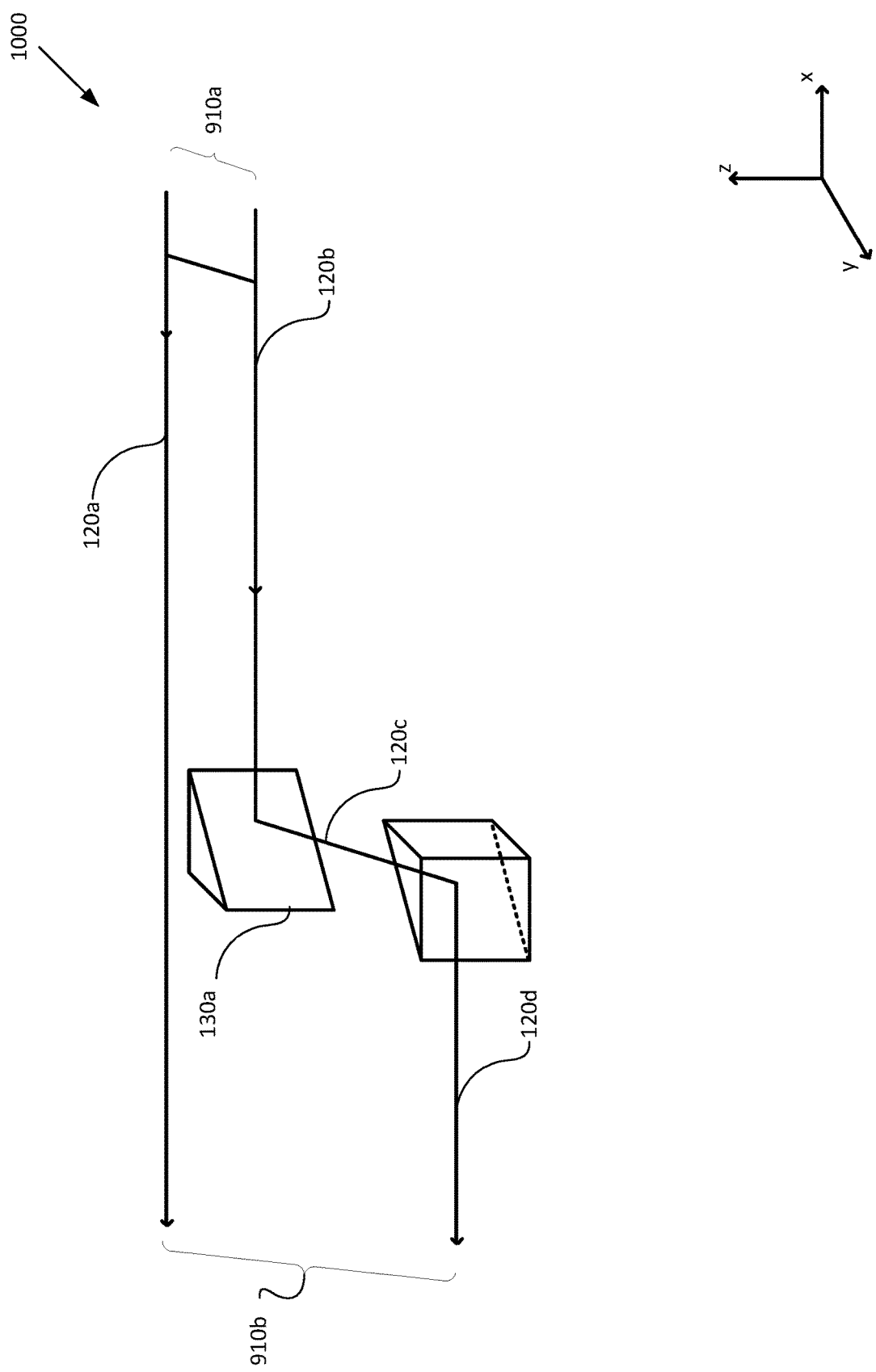
FIG. 10 illustrates a mirror arrangement, according to embodiments of the present disclosure.

FIG. 10 illustrates a mirror arrangement 1000, according to embodiments of the present disclosure. In the mirror arrangement 1000 of FIG. 10, two mirrors 130*a-b* are disposed in the substrate to adjust a spacing between two light paths as received and as output on the same plane. For example, a first distance 910*a* between a first waveguide 120*a* and a second waveguide 120*b* as input may be different than a second distance 910*b* between a third waveguide 120*c* in the second light path and the first waveguide 120*a* as output. A fabricator may define the waveguides 120 and mirrors 130 such that multiple mirrors 130 redirect optical signals received on waveguides 120 arranged in one pattern into a differently spaced version of that pattern on the same or a different plane and/or direction as the waveguides 120 are received. Accordingly, a fabricator may redefine the relative spacing of two or more light paths on the same plane.

The mirror arrangements illustrated in FIGS. 5-10 are provided as non-limiting examples of some of the ways a fabricator can deploy mirrors 130 and waveguides 120 to redirect and rearrange some or all of the incoming signal paths into new planes, orders, and/or directions. A fabricator may use more or fewer than the illustrated number of waveguides 120 and/or mirrors 130 and may combine, reverse, and modify the example mirror arrangements as illustrated to meet the use cases particular to a given periscope assembly application.

Figure 11A:
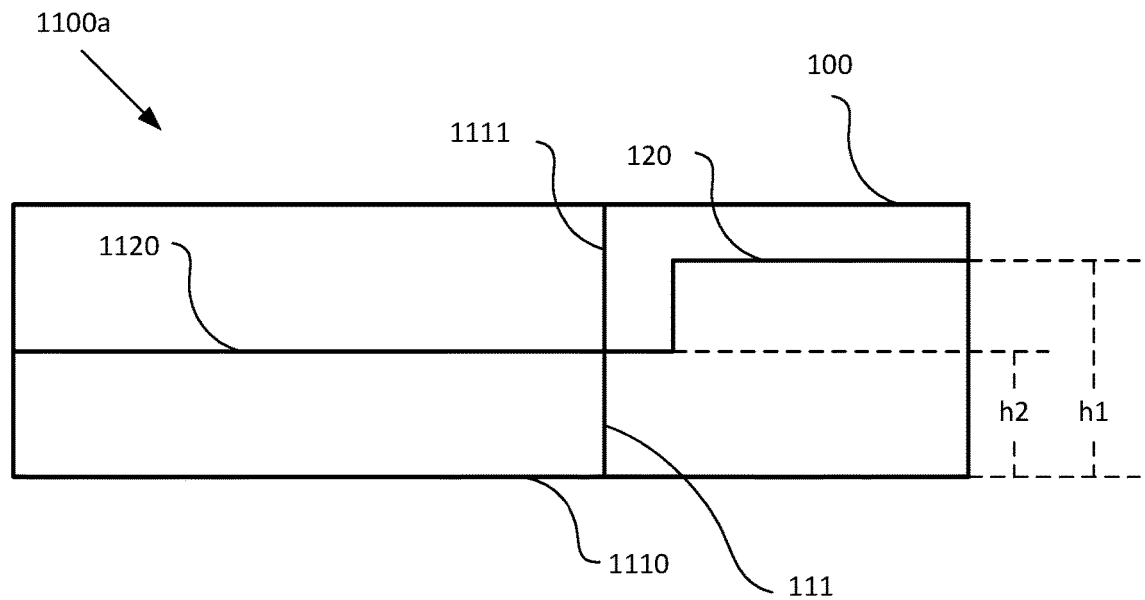
FIGS. 11A and 11B illustrate coupling arrangements for a periscope assembly and another optical element, according to embodiments of the present disclosure.
Figure 11B:
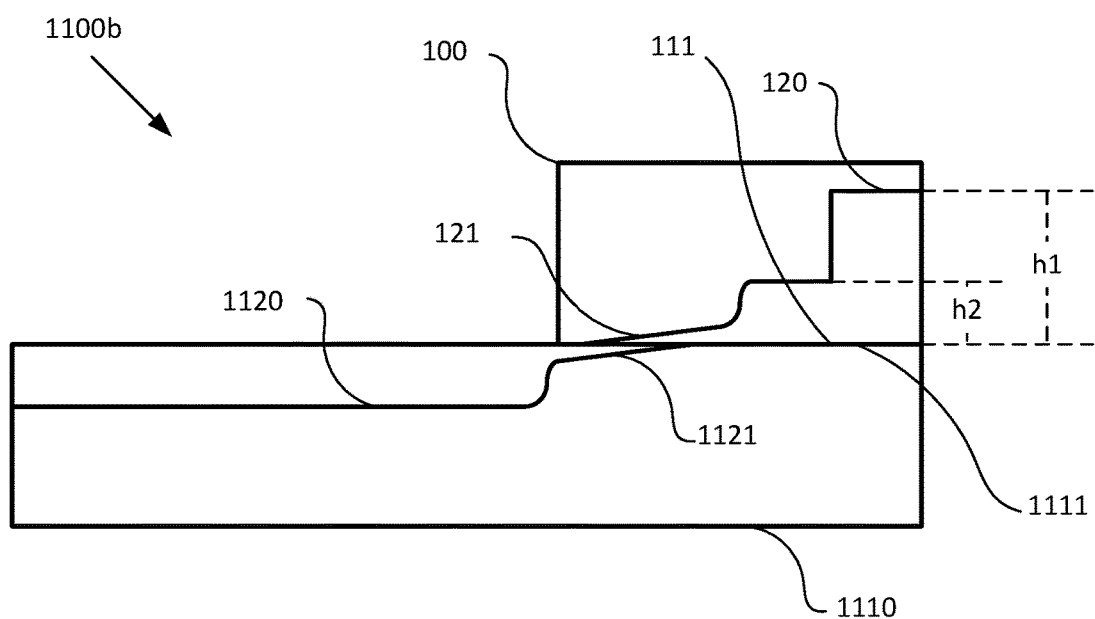

FIGS. 11A and 11B illustrate coupling arrangements 1100*a-b* for a periscope assembly 100 and another optical element 1110, such as, for example, a photonic platform or an optical cable, according to embodiments of the present disclosure.

FIG. 11A illustrates a direct coupling arrangement 1100*a* (also referred to as a butt-coupling), in which a light path travels directly through a joint formed by the mating surface 111 of the periscope assembly 100 and mating surface 1111 of the optical element 1110. As illustrated, the periscope assembly 100 abuts the optical element 1110, with mating surfaces 111/1111 perpendicular to the light path formed by the waveguides that carry optical signals between the periscope assembly 100 and the optical element 1110. The waveguides 120 of the periscope assembly 100 are located at a first height $h_1$ on a first side (not coupled with the optical element 1110) and are located at a different, second height $h_2$ on a second side coupled with the optical element 1110. In the direct coupling arrangement 1100*a*, the waveguides 1120 of the optical element 1110 are linearly arranged to receive light via direct transmission from the waveguides 120 of the periscope assembly 100. In various embodiments, lenses, filters, and surface treatments may be applied on the mating surfaces 111/1111 to aid in direct transfer of optical signals.

FIG. 11B illustrates an evanescent coupling arrangement 1100*b* in which a mating surface 111 of the periscope assembly 100 is connected to a mating surface 1111 of an optical element 1110, and the light path through the periscope assembly 100 is not perpendicular to mating surfaces 111/1111. Instead, an evanescent region 121 of the waveguides 120 is incident to the mating surface 111, which evanescently transfers optical signals to/from an evanescent region 1121 of the waveguides 1120 of the optical element 1110 that are incident to the mating surface 1111. The waveguides 120 of the periscope assembly 100 are located at a first height $h_1$ on a first side (not coupled with the optical element 1110) and drop to a second height $h_2$ at which the evanescent region 121 begins.

Figure 12:
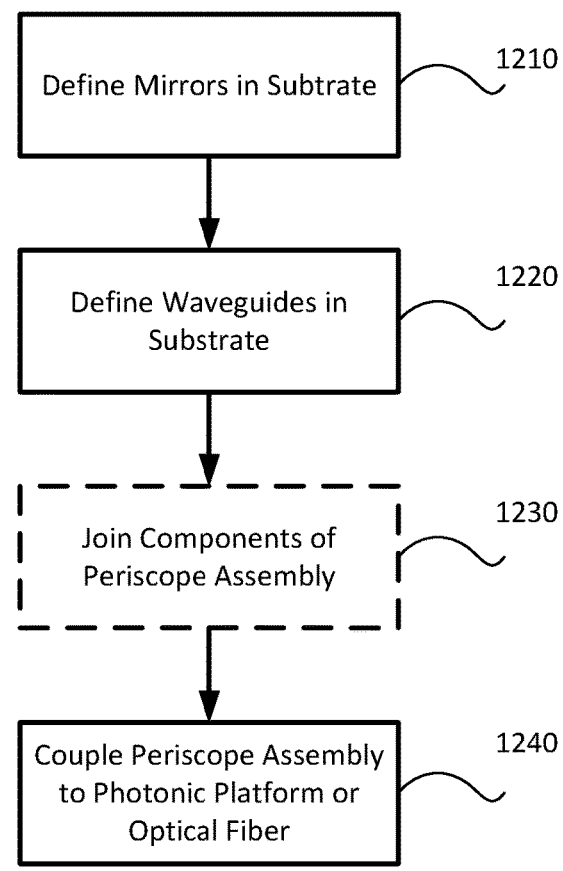
FIG. 12 is a flowchart of a method to deploy a periscope optical assembly.

FIG. 12 is a flowchart of a method 1200 to deploy a periscope optical assembly, according to embodiments of the present disclosure.

At block 1210, a fabricator defines one or more mirrors 130 in a substrate (e.g., a bulk material 110). At block 1220, the fabricator defines one or more waveguides in the substrate. Although illustrated as beginning with block 1210 and proceeding to block 1220, in various embodiments, method 1200 may begin with either of block 1210 or block 1220 and proceed to the other, or may begin simultaneously at block 1210 and block 1220. Additionally or alternatively, a fabricator may perform block 1210 and block 1220 in alternating iterations (e.g., forming a first mirror 130*a*, then forming one or more waveguides 120, then forming a second mirror 130*b*) or in phases (e.g., performing a first phase of block 1210, performing block 1220, performing a second phase of block 1220).

When forming mirrors 130 (per block 1210), a fabricator may use one or more of a laser patterning process or an etching process to define mirrors 130 in the substrate. A laser patterning process defines mirrors 130 via a change in the material matrix of the substrate that affects the reflectivity of the substrate in a designated region, thereby defining a reflective surface 310 with a desired shape and orientation in the substrate. An etching process removes material from the substrate to define a void with one or more surfaces that may be polished or have a surface treatment applied thereto, thereby defining a reflective surface 310 with a desired shape and orientation in the substrate. In various embodiments, the etching process is preceded by a laser patterning process that changes the reactivity of a designated region of the substrate to a chemical etchant (e.g., via changing the chemical bond in regions of the material matrix of the substrate). The reflective surface 310 receives optical signals carried on one waveguide 120 and redirects those optical signals by a predefined reflective angle 410 onto another waveguide 120.

When forming waveguides 120 (per block 1220), a fabricator may use a laser patterning process to define regions in the substrate with different refractive indices than the surrounding material to direct the propagation of light through the material. The waveguides 120 may have ends that are co-aligned with engagement features defined in the substrate to ensure optical coupling with waveguides in other assemblies or components. Similarly, the waveguides 120 may have ends that that are co-aligned with one or more mirrors 130.

In some embodiments, the laser defines where the waveguide pattern is located simultaneously with where the etching pattern is applied relative to the alignment point. In other embodiments, the etching pattern is applied relative to the alignment point, and the waveguide pattern is later applied relative to the etching pattern (e.g., after a chemical etch). In further embodiments, the waveguide pattern is applied relative to the alignment point, and the etching pattern is later applied relative to the waveguide pattern.

At block 1230, when the fabricator uses a multi-component periscope assembly (e.g., as in FIG. 2), the fabricator joins the components 210 together. In various embodiments, the fabricator may detail the components before joining, which may include dicing the substrate into a desired shape, polishing at least one external surface, applying epoxies or heat treatments for affixing the components together, and the like. Various alignment features may be included in the components to ensure that the portions of waveguides 120 defined in different components are optically aligned with one another. Depending on the design of the periscope components, the periscope parts can be aligned using active or passive alignment processes.

At block 1240, the fabricator couples the periscope assembly to one or more of an optical fiber or a photonic platform. In various embodiments, based on the alignment and pathing of the waveguides 120, the fabricator may couple the periscope assembly via an evanescent transfer or direct transfer (e.g., a butt coupling) of optical signals to/from the photonic platform or optical fiber. The fabricator may couple the periscope assembly and the other optical elements together via epoxies, physical interconnects, thermo-compression, or the like. Method 1200 may then conclude.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

In view of the foregoing, the scope of the present disclosure is determined by the claims that follow.

We claim:

1. An interposer, comprising:
   a bulk material having a first side and a second side opposite to the first side;
   a first optic defined in the bulk material at a first height in the bulk material along an axis extending between the first side and the second side, wherein the first optic is located at a first distance between the first side and the second side;
   a second optic defined in the bulk material at a second height in the bulk material, different than the first height, along the axis, wherein the second optic is located at the first distance between the first side and the second side and defines an evanescent region between the second side and the second optic;
   a first waveguide defined in the bulk material, extending from the first side to the first optic;
   a second waveguide defined in the bulk material, extending from the second optic to the second side; and
   a third waveguide defined in the bulk material, extending from the first optic to the second optic.

2. The interposer of claim 1, wherein the bulk material is divided into a first bulk material comprising a first component and a second bulk material comprising a second component;
   the first component comprising:
      the first waveguide;
      the first optic; and
      a first portion of the third waveguide;
   the second component comprising:
      the second waveguide;
      the second optic; and
      a second portion of the third waveguide; and
   wherein the first component is joined to the second component to align the first portion with the second portion of the third waveguide.

3. The interposer of claim 1, further comprising:
   a fourth waveguide defined in the bulk material, extending from the first side to the second side, wherein a first distance between the first waveguide and the fourth waveguide on the first side is different than a second distance between the second waveguide and the fourth waveguide on the second side.

4. The interposer of claim 1, wherein one or more of the first optic, the second optic, the first waveguide, the second waveguide, and the third waveguide are defined by an laser patterning affecting a reflectivity of the bulk material.

5. The interposer of claim 1, wherein one or more of the first optic and the second optic are defined via a lithography and etching process and a surface treatment to apply a reflective surface within the bulk material.

6. The interposer of claim 1, wherein the first waveguide travels in a first direction at the first height and the second waveguide travels in the first direction at the second height.

7. The interposer of claim 1, further comprising:
   a third optic defined in the bulk material at a third height in the bulk material, different than the first height and the second height, between the first side and the second side;
   a fourth optic defined in the bulk material at the second height in the bulk material between the first side and the second side;

a fourth waveguide, running from the first side to the third optic;

a fifth waveguide, running from the fourth optic to the second side; and a sixth waveguide, running from the third optic to the fourth optic.

8. The interposer of claim 7, wherein the first optic and the third optic are mirrors, wherein the first optic has a first reflective angle that is different than a second reflective angle of the third optic.

9. The interposer of claim 7, wherein the first optic is located at a first distance between the first side and the second side and the third optic is located at a second distance between the first side and the second side, different than the first distance.

10. A method, comprising:

defining a first mirror in a bulk material at a first height;

defining a second mirror in the bulk material at a second height, different than the first height;

defining a first waveguide in the bulk material, optically connected to the first mirror and a first edge of the bulk material;

defining a second waveguide in the bulk material, optically connected to the second mirror and a second edge of the bulk material, different than the first edge, and defining an evanescent region between the second edge and the second mirror; and defining a third waveguide in the bulk material, optically connected to the first mirror and the second mirror to define a light path from the first edge to the second edge via the first waveguide, the first mirror, the third waveguide, the second mirror, and the second waveguide.

11. The method of claim 10, further comprising:

joining a first component to a second component;

wherein the first component includes the first mirror, the first waveguide, and a first portion of the third waveguide;

wherein the second component includes the second mirror, the second waveguide, and a second portion of the third waveguide; and wherein the first component and the second component are aligned such that when joined, the first portion of the third waveguide is collinear with the second portion of the third waveguide.

12. The method of claim 10, wherein the defining the first mirror further comprises:

etching a void into the bulk material; and applying a surface treatment to increase a reflectivity of a face defined by the void.

13. The method of claim 10, wherein the defining the second mirror further comprises:

patterning, via a laser, a prism having a reflective surface in the bulk material.

14. A system, comprising:

a first waveguide defined in a first plane of a bulk material;

a second waveguide defined in a second plane of the bulk material, parallel to the first plane;

a third waveguide defined in a third plane of the bulk material that intersects the first plane and the second plane;

a first mirror defined at a first intersection of the first plane and the third plane and optically connected to the first waveguide and the third waveguide; and a second mirror defined at a second intersection of the third plane and the second plane and optically connected to the third waveguide and the second waveguide; and wherein the second waveguide defines an evanescent region between the second mirror and a surface of the bulk material.

15. The system of claim 14, further comprising:

a first component, including:
the first waveguide;
the first mirror;
a first portion of the third waveguide;

a second component, including:
the second waveguide;
the second mirror; and
a second portion of the third waveguide; and wherein the first component is bonded with the second component such that the first portion of the third waveguide and the second portion of the third waveguide are linearly aligned in the third plane.

16. The system of claim 14, further comprising:

a fourth waveguide, defined in a fourth plane in the bulk material, parallel to the first plane;

a fifth waveguide defined in the second plane of the bulk material;

a sixth waveguide defined in a fifth plane of the bulk material that intersects the fourth plane and the second plane;

a third mirror defined at a third intersection of the fourth plane and the fifth plane and optically connected to the fourth waveguide and the sixth waveguide; and a fourth mirror defined at a fourth intersection of the fifth plane and the second plane and optically connected to the sixth waveguide and the fifth waveguide.

17. The system of claim 14, wherein a first reflective angle between the first waveguide and the third waveguide is 90 degrees; and wherein a second reflective angle between the second waveguide and the third waveguide is 90 degrees.

18. The system of claim 14, wherein the first mirror is a reflective surface defined in a void etched into the bulk material.

19. The system of claim 14, wherein the second mirror is a reflective surface of a prism structure defined via laser patterning of a material matrix of the bulk material.

* * * * *

UNITED STATES PATENT AND TRADEMARK OFFICE
CERTIFICATE OF CORRECTION

| | |
|---|---|
| PATENT NO. | : 10,877,219 B1 |
| APPLICATION NO. | : 16/546084 |
| DATED | : December 29, 2020 |
| INVENTOR(S) | : Matthew J. Traverso, Ashley J. Maker and Sandeep Razdan |

It is certified that error appears in the above-identified patent and that said Letters Patent is hereby corrected as shown below:

In the Claims

In Column 10, Line 11, in Claim 1, delete "between" and insert -- parallel to --.

Signed and Sealed this
Third Day of September, 2024

Katherine Kelly Vidal
*Director of the United States Patent and Trademark Office*